United States Patent Office 3,491,152
Patented Jan. 20, 1970

3,491,152
RESOLUTION OF OPTICAL ISOMERS OF PROPYLENE GLYCOL AND CERTAIN KETONES
William L. Howard and Joanne D. Burger, Lake Jackson, Tex., assignors to The Dow Chemical Company, Midland, Mich., a corporation of Delaware
No Drawing. Filed June 22, 1967, Ser. No. 647,925
Int. Cl. C07c 45/22, 29/26; C07d 13/00
U.S. Cl. 260—586             7 Claims

ABSTRACT OF THE DISCLOSURE

When a cyclic ketal is made from propylene glycol and a ketone containing an asymmetric carbon atom, such as camphor or menthone, and one of the reactants is optically active, one diastereoisomer of the ketal product can be separated by fractional distillation. Epimerization of the remainder of the mixture produces more of the isomer being removed, thus resulting in resolution of the racemic reactant used to make the ketal.

Background of the invention

Both optically active forms of propylene glycol have been prepared by several methods, including procedures which start with optically active sugars (Baer and Fischer, J. Am. Chem. Soc. 70, 609 (1948), a seven step process) and others which depend on the action of microorganisms (Price, J. Org. Chem. 24, 1169 (1959), a yeast fermentation which starts with acetol). References to actual resolution of the glycol are rare, and the processes met with only limited success. Lucas, Mitchell, Scully, J. Am. Chem. Soc. 72, 5491 (1950) describe a tedious process in which only 13% of the full rotation of the pure active isomer was attained. There is no reference to a resolution of menthone although it too has been prepared or isolated from natural products in both its forms. Camphor has been resolved in at least two ways, one involving menthyl aminocarbamate which forms diastereoisomeric hydrazones with the camphor which are separated by crystallization (Woodward, Kohman, and Harris, J. Am. Chem. Soc. 63, 120 (1941)), and the other a process in which the racemic camphor is converted to its cyclic ketals with optically active 2,3-butanediol, the diastereoisomers then being separated by gas chromatography (Casanova and Corey, Chem. & Ind. (London), 1961, 1664; Chem. Abst. 56:7364e).

Summary of the invention

The process of the invention comprises the formation of a cyclic ketal by the condensation of propylene glycol with a ketone having an asymmetric carbon atom, one of the reactants being optically active.

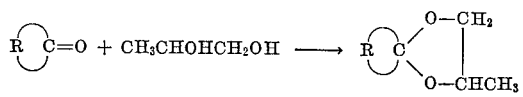

wherein R< represents the residue obtained by removal of the carbonyl group from camphor or methone.

The formation of the cyclic ketal structure renders asymmetric the carbonyl carbon atom of the ketone; hence, the ketal contains 3 asymmetric centers and consists of 4 diastereoisomers. Thus, if the optically active reactant is called $R_1$, the racemic reactant is called $R_2$ and the asymmetric carbon atom originating from the carbonyl group (hereinafter referred to as the "ketal carbon") is called K, the four diastereoisomers can be represented as follows:

| Compound No. | $R_1$ | $R_2$ | K |
|---|---|---|---|
| 1 | l | d | d |
| 2 | l | d | l |
| 3 | l | l | d |
| 4 | l | l | l | or, if $R_1$ is d-, a similar set exists as follows:

| Compound No. | $R_1$ | $R_2$ | K |
|---|---|---|---|
| 5 | d | l | l |
| 6 | d | l | d |
| 7 | d | d | l |
| 8 | d | d | d |

The process of the invention involves two features of the above mixtures of 4 isomers:

(1) One of the four has a lower boiling point than the others, thus permitting its separation by fractional distillation.

(2) One isomer differs in only one respect from that removed by distillation; this difference being the configuration at K, the ketal carbon atom. This one asymmetric center can be selectively epimerized (racemized) by an acid treatment without disturbing the other two asymmetric centers.

Thus, the two diastereoisomers derived from a single enantiomorph of the racemic reactant are removed from the original 4-component mixture, thereby leaving a residue consisting of, or at least enriched in, the 2 diastereoisomers derived from the other enantiomorph of the racemic reactant.

As an illustration of the above principles, if l-menthone is the active ketone reactant $R_1$ and racemic propylene glycol is reactant $R_2$ in the above tabulation, Compound 3 is the lowest-boiling of the four diastereoisomers. After it has been at least partially removed by distillation, the residue is racemized at the ketal carbon only by warming in the presence of an acidic catalyst, thereby converting a portion of Compound 1 into Compound 3. Compound 3 is now again distilled from the mixture and the cycle repeated until Compounds 1 and 3 are reduced to any desired level in the residue. The distillate consists of Compound 3 of any degree of purity consonant with the efficiency of the fractional distillation. The distillate contains predominantly d-propylene glycol moieties while the residue is at least enriched in l-glycol moieties and may be essentially free of d-glycol moieties. The d- and l-glycols are then recovered from the separated ketals by mild hydrolysis such that the active centers are not racemized.

In a preferred manner of operating the process of the invention, the racemization step and the distillation step are carried out simultaneously, either batchwise or continuously. This is done by putting the racemization catalyst into the original mixture of ketals, heating the catalyzed mixture at a temperature suitable for racemizing the ketal asymmetric center, K, but at which the asymmetric centers of the ketone and glycol are not affected, and distilling the low-boiling ketal from the mixture as it is formed. This may require adjusting the pressure so that the distillation can be conducted at the chosen racemization temperature.

The process of the invention can be applied to the resolution of racemic propylene glycol, or other glycol having an asymmetric carbon atom, by combination with an optically active ketone, preferably a cyclic ketone. Conversely, it can be applied to the resolution of a racemic ketone by combination with an optically active glycol. The only limitation is that one of the four diastereoisomeric ketals have a boiling point sufficiently above or below the others to permit a practical separation.

Detailed description of the invention

The reaction whereby a ketal is made by the condensation of a ketone with a glycol is well known. Typically it is effected by the mild heating of a mixture of the reactants with an acid catalyst, the byproduct water being removed as formed. The reaction is conveniently conducted in an inert solvent that forms an azeotrope with water, such as benzene, toluene, xylene, carbon tetrachloride, perchloroethylene or petroleum ether. The water can then be separated from the azeotrope and the solvent recycled to the reactor. Suitable catalysts for both the ketal formation and the racemization step include the common acid catalysts, such as sulfuric acid, arylsulfonic acids, strongly acidic ion exchange resins, and the like. The same catalysts, of course, are suitable for hydrolysis of the ketals after their separation.

The ketals may also be made by the known reaction of propylene oxide with the carbonyl group of the ketone in the presence of Lewis acid catalysts such as boron trifluoride and anhydrous stannic chloride. The reaction is exothermic and is preferably carried out in the presence of an inert solvent such as carbon tetrachloride or methylene chloride. It is convenient to use an inert solvent of low boiling point so that the heat of reaction may be dissipated in the reflux condenser, while at the same time the reaction is maintained at the desired moderate temperature by the boiling of the solvent, with the resultant elimination of the need for external cooling of the reaction mixture. This is the preferred method when the ketone is camphor, and the yield of ketal is about 95%, based on the amount of camphor taken. About 5–7% of the camphor does not react and can be recovered.

For the resolution of racemic propylene glycol, the preferred ketones are l-menthone and d-camphor, both being readily available at low cost. Likewise, for the resolution of racemic ketones, such as camphor and menthone, either d- or l-propylene glycol, as well as other active glycols, is suitable. In either case the optically active reactant can be recovered and recycled to the process.

Since in general the differences in boiling points of the diastereoisomeric ketals are at most only a few degrees, a highly efficient fractionating column is essential to effect a practical separation. Preferably it should have the equivalent of at least about 100 theoretical plates.

The practice of the invention is illustrated by the following examples.

Step 1.—Preparation of the diastereoisomeric ketals of l-menthone and dl-propylene glycol A mixture of 4670 g. of l-menthone (made by the chromic acid oxidation of l-menthol), 3000 g. of dl-propylene glycol, 9340 ml. of carbon tetrachloride, and 0.1 g. of p-toluenesulfonic acid was distilled through a Vigreux column; the water in the distillate was separated externally and the organic phase was continuously returned to the boiling flask; and the process was continued until no more water was being produced. Most of the carbon tetrachloride was then removed by distillation, and the residue was extracted with water to remove the unreacted propylene glycol. The first portion of water used in the extraction contained sodium carbonate in excess of that required to neutralize the acid in the reaction mixture. The organic phase containing the ketal isomers was then distilled, and the fraction boiling from 96° to 102° at 9 mm. was collected. It consisted of the ketal isomers and a small amount of menthone (less than 1%).

Step 2.—Separation of the ketal diastereoisomers

A. Stepwise re-equilibration: There was not available to us a fractionating column of sufficient efficiency to separate completely the lowest boiling ketal isomer, so successive redistillations were performed to achieve the separation. The initial mixture of ketals, and later the mixtures after the re-equilibration reaction, were distilled through a 1 in. x 6 ft. jacketed glass column packed with 3.5 ft. of 316 stainless steel Goodloe packing and 2.5 ft. of monel Goodloe packing. The pressure was regulated at from 10 to 15 mm. which gave head temperatures of about 110° and kettle temperatures of about 125°. Distillates from this column were then redistilled with glass or metal helices, successive distillations being carried out on the resulting distillates which were becoming richer in the lowest boiling component. The distillation residues were, of course, passed in the opposite direction toward the re-equilibration reaction as they became depleted in the lowest-boiling ketal. Similar temperatures and pressures were used for all distillations. Distillate fractions were recombined according to the concentration of the lowest-boiling isomer for the successive distillations. Thus fractions and reaction mixtures up to 40% in the subject isomer were distilled on the first column, from 40 to 70% on the second, from 70 to 90% on the third, and finally above 90% on the last. Distillation on the first column was usually continued until the subject isomer had been depleted in the kettle to 1 to 2%; then the mixture was re-equilibrated. But toward the end of the process when the re-equilibration generated less than 5% of the lowest-boiling isomer, the distillation was continued until this isomer could not be detected.

The progress of the distillation was followed by gas chromatography on a column packed with 20% Oronite NI-W [1] on Gaschrom CLA [2] at 160° with thermal conductivity detection.

The re-equilibration was performed by adding about 1 g. of p-toluenesulfonic acid to 1000 ml. of ketal mixture, and heating at about 75° until analysis showed no further change in isomer ratios. This usually required about 24 hours. The acid catalyst was then neutralized by the addition of 1 g. of NaOH in 20 ml. of ethanol followed by the addition of 3 g. of $NaHCO_3$. The mixture was filtered and distillation was resumed. After the last re-equilibration and distillation to remove the lowest-boiling isomer, at which time the residue mixture gave a test sample of glycol on hydrolysis that was 96% optically pure l-form, the distillation was continued to isolate the predominantly l-glycol ketals in purified condition. This product distilled at 108°/10 mm.

B. Continuous re-equilibration: Instead of employing a separate re-equilibration step between distillations of the lowest boiling diastereoisomer, the mixture of diastereoisomers may be acidified with p-toluenesulfonic acid (or other suitable non-volatile acid catalyst) and distilled to remove the lowest boiling diastereoisomeric ketal. The equilibration proceeds during the distillation and enables the removal of substantially all of the d-isomer moieties of propylene glycol, leaving a residue of the two diastereoisomeric ketals containing only the l-moieties of the glycol.

EXAMPLE 1

Preparation of l-menthone dl-propylene glycol cyclic ketal

A mixture of 400 ml. of the diastereoisomeric ketals of l-menthone and dl-propylene glycol, containing the d-isomer moiety of the glycol to the extent of about 20%, acidified with 1 g. of p-toluenesulfonic acid, was carefully distilled on an efficient fractionating column under a pressure of 10 mm. of mercury. After 260 ml. of distillate had been collected at 106° C. (10 mm.), no ---
[1] A surface active agent made by Chevron Chemical Co., Oronite Div., Houston, Tex.
[2] A support material made by Applied Science Laboratories, Inc., 140 N. Barnard St., State College, Pa.

more of the lowest-boiling diastereoisomeric ketal was being distilled. The 260 ml. was collected in fractions of about 30–50 ml. which ranged in concentration of lowest boiling ketal from 50% down to 5%. The residue then gave 140 ml. of ketal mixture which was hydrolyzed to l-propylene glycol of greater than 97% optical purity. The 260 ml. of forerun could be redistilled to isolate the lowest boiling ketal and the residue therefrom recycled through the process of this example.

Step 3.—Hydrolysis of the ketals and isolation of the optically active propylene glycols The separated diastereoisomers of the menthone-glycol ketal, which contained essentially only d- or l-glycol moieties respectively, were hydrolyzed in an acidified mixture of water and isopropyl alcohol, the latter being added as a mutual solvent for the ketal and water. After completion of the hydrolysis, benzene was added and the d- or l-glycol was recovered in the aqueous phase and the menthone in the benzene phase. After the usual washings of the separate phases, the optically active forms of propylene glycol and the recovered menthone were purified and isolated by distillation. The optical rotation of the d-propylene glycol thus obtained was higher than that reported in the literature for d-propylene glycol made by other methods. The rotation of the l-glycol indicated 96% optical purity.

A mixture of 300 g. of ketal diastereoisomers (containing either d- or l-propylene glycol moieties), 200 ml. of isopropyl alcohol, 100 ml. of water, and 0.05 g. of p-toluenesulfonic acid was heated overnight under reflux. After being cooled slightly, the mixture was made alkaline by the addition of 0.05 of potassium carbonate dissolved in a few ml. of water. At room temperature, the glycol, menthone, and isopropyl alcohol were partitioned between water and benzene. The glycol was then recovered from the water phase by distillation. The yield was practically quantitative, based on the ketal taken. The menthone was recovered from the benzene layer.

The specific rotation of the undiluted d- and l-glycol for the Na D-line at 25° C. were +16.35° and −15.02°, respectively.

The recovered menthone showed a specific rotation of −11.72°, indicating some conversion to isomenthone which was confirmed by gas chromatography.

EXAMPLE 2

Preparation of d-camphor dl-propylene glycol cyclic ketal

A mixture of 500 g. of d-camphor, 500 ml. of carbon tetrachloride, and 25 ml. (55 g.) of anhydrous stannic chloride was stirred while a mixture of 340 ml. of propylene oxide and 340 ml. of carbon tetrachloride was added. The temperature of the reaction mixture was kept between 20 and 25° by external cooling. About 10 minutes after all the propylene oxide had been added, a solution of 100 g. of sodium hydroxide in a liter of water was added to neutralize stannic chloride and stabilize it. The mixture was vigorously stirred for 15 minutes. The phases were separated, and water phase was discarded, and the carbon tetrachloride phase was dried with sodium sulfate.

The carbon tetrachloride phase was distilled through a Vigreux column at atmospheric pressure until the temperature of the liquid in the boiling flask rose to 120°. The mixture was then distilled under reduced pressure on a packed distillation column. The d-camphor dl-propylene glycol cyclic ketal was obtained in 80% yield (550 ml.) B.P., 64°/2 mm., $d_{25}$ 0.996 g./ml., $n_D^{25}$, 1.4708. Approximately 100 ml. fractions were taken during this distillation and the optical rotation $[\alpha]_D^{25}$ of the fractions changed from −8° (neat) for the first fraction to $[\alpha]_D^{25}$ −0.5° for the last fraction. A sample of each of three of the distillation fractions was hydrolyzed and the optical purity of the resulting propylene glycol was determined. The first distillation fraction gave glycol that was 54% the l-form, the middle fraction was 58% l-glycol, and the last fraction was 58% d-propylene glycol, and by difference the respective fractions also contained 46%, 42%, and 42% of the enanthiomeric form, thus demonstrating that the resolution by fractional distillation is possible and can be carried to any requisite degree of completion by continued fractionation.

Racemic menthone, camphor or the like, can be resolved by the above process by use of active d- or l-glycol to make the intermediate ketal.

We claim:

1. The process comprising the steps of
   (a) condensing camphor or menthone with 1,2-propylene glycol or 1,2-propylene oxide to form a cyclic ketal consisting of a ketone moiety and a propylene moiety, at least one of said moieties being optically active and the other being racemic, thus to form a mixture of four diastereoisomeric cyclic ketal isomers, one of which has a boiling point significantly different from the others;
   (b) subjecting said mixture to fractional distillation, thus to obtain a first fraction rich in said isomer and a second fraction lean in said isomer;
   (c) racemizing said second fraction at the ketal carbon atom only by heating with a catalytic amount of an acidic racemization catalyst, thus converting a portion of a second isomer into the first said isomer;
   (d) again subjecting the residue to fractional distillation, thus to obtain an additional first fraction rich in the first said isomer and additional second fraction lean in both the said isomers, both of said isomers containing the same enanthiomorph of the racemic reactant used to make the ketal;
   (e) hydrolyzing at least one of the said fractions and recovering therefrom an optically active form of the original racemic reactant.

2. The process of claim 1 wherein the ketone is condensed with propylene glycol.

3. The process of claim 2 wherein the glycol is the racemic reactant.

4. The process of claim 3 wherein the ketone is l-menthone.

5. The process of claim 4 wherein the ketone is d-camphor.

6. The process of claim 2 wherein steps (b), (c) and (d) are combined and carried out concurrently by fractionally distilling the mixture in the presence of an acidic racemization catalyst.

7. The process of claim 6 wherein the ketone is l-menthone, the glycol is racemic propylene glycol, the racemization catalyst is p-toluenesulfonic acid, the glycol obtained by hydrolysis of the first fraction is predominantly d-propylene glycol and that obtained by hydrolysis of the second fraction is predominantly l-propylene glycol.

References Cited

Finch et al.: "Journal of the American Chemical Society," vol. 87 (1965), pp. 5520–21.

ALEX MAZEL, Primary Examiner

J. H. TURNIPSEED, Assistant Examiner

U.S. Cl. X.R.

260—340.9, 635, 637